(12) United States Patent
Houjyou et al.

(10) Patent No.: US 10,840,545 B2
(45) Date of Patent: *Nov. 17, 2020

(54) SLURRY, METHOD FOR PRODUCING SOLID ELECTROLYTE LAYER, AND METHOD FOR PRODUCING ALL-SOLID-STATE BATTERY

(71) Applicant: TOYOTA JIDOSHA KABUSHIKI KAISHA, Toyota (JP)

(72) Inventors: Yasutoshi Houjyou, Numazu (JP); Shingo Ohta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

This patent is subject to a terminal disclaimer.

(21) Appl. No.: 16/121,030

(22) Filed: Sep. 4, 2018

(65) Prior Publication Data

US 2019/0074543 A1 Mar. 7, 2019

(30) Foreign Application Priority Data

Sep. 5, 2017 (JP) ................................ 2017-170611

(51) Int. Cl.
| | |
|---|---|
| *H01M 4/38* | (2006.01) |
| *H01M 4/485* | (2010.01) |
| *H01M 4/52* | (2010.01) |
| *H01M 4/587* | (2010.01) |
| *H01M 10/0525* | (2010.01) |
| *H01M 10/0562* | (2010.01) |
| *H01M 10/0585* | (2010.01) |
| *H01M 4/525* | (2010.01) |

(52) U.S. Cl.
CPC ... *H01M 10/0562* (2013.01); *H01M 10/0525* (2013.01); *H01M 10/0585* (2013.01); *H01M 4/386* (2013.01); *H01M 4/485* (2013.01); *H01M 4/525* (2013.01); *H01M 4/587* (2013.01); *H01M 2300/0071* (2013.01)

(58) Field of Classification Search
CPC ...... H01M 4/386; H01M 4/485; H01M 4/525; H01M 4/587; H01M 10/0525; H01M 10/0562; H01M 10/0585; H01M 2300/0071

See application file for complete search history.

(56) References Cited

U.S. PATENT DOCUMENTS

| | | | |
|---|---|---|---|
| 6,645,675 | B1 | 11/2003 | Munshi |
| 8,986,895 | B2 | 3/2015 | Ohta et al. |
| 9,531,036 | B2 | 12/2016 | Ohta et al. |
| 2007/0259271 | A1 | 11/2007 | Nanno et al. |
| 2010/0203383 | A1 | 8/2010 | Weppner |
| 2011/0244337 | A1 | 10/2011 | Ohta et al. |
| 2013/0266842 | A1 | 10/2013 | Woehrle et al. |
| 2013/0323604 | A1 | 12/2013 | Teshima et al. |
| 2014/0017577 | A1* | 1/2014 | Minami ............ H01M 4/9016 |
| | | | 429/405 |
| 2014/0099528 | A1 | 4/2014 | Lockett et al. |
| 2014/0162113 | A1 | 6/2014 | Ohta et al. |
| 2014/0227614 | A1 | 8/2014 | Lee et al. |
| 2015/0056519 | A1 | 2/2015 | Ohta et al. |
| 2015/0099188 | A1* | 4/2015 | Holme ............... C04B 35/6262 |
| | | | 429/231.95 |
| 2015/0111110 | A1 | 4/2015 | Watanabe et al. |
| 2017/0222254 | A1* | 8/2017 | Sakamoto .......... H01M 4/0471 |
| 2017/0346092 | A1 | 11/2017 | Yada et al. |
| 2018/0175446 | A1 | 6/2018 | Nishizaki et al. |
| 2018/0219253 | A1 | 8/2018 | Ohta |
| 2018/0248201 | A1 | 8/2018 | Shimoda et al. |
| 2019/0088993 | A1 | 3/2019 | Ohta |
| 2019/0207248 | A1 | 7/2019 | Ohta |

(Continued)

FOREIGN PATENT DOCUMENTS

| | | |
|---|---|---|
| EP | 3252024 A1 | 12/2017 |
| EP | 3410529 A1 | 12/2018 |

(Continued)

OTHER PUBLICATIONS

Awaka et al., "Single Crystal Synthesis of Cubic Garnet Related-type $Li_7La_3Zr_2O_{12}$ by a Self-Flux Method", Key Engineering Materials, 2011, vol. 485, pp. 99-102 (total 4 pages).

Awaka et al., "Synthesis and structure analysis of tetragonal $Li_7La_3Zr_2O_{12}$ with the garnet-related type structure", Journal of Solid State Chemistry, 2009, vol. 182, pp. 2046-2052 (total 7 pages).

Roof et al., "Crystal growth of a series of lithium garnets $Ln_3Li_5Ta_2O_{12}$ (Ln=La, Pr, Nd): Structural properties, Alexandrite effect and unusual ionic conductivity", Journal of Solid Chemistry, 2009, vol. 182, pp. 295-300 (total 6 pages).

(Continued)

*Primary Examiner* — Anca Eoff (74) *Attorney, Agent, or Firm* — Sughrue Mion, PLLC (57) ABSTRACT

Provided are a slurry for a solid electrolyte, which can reduce the usage of a polymer binder, a method for producing a solid electrolyte layer, and a method for producing an all-solid-state battery. Disclosed is a slurry for a solid electrolyte, the slurry comprising a solvent, a lithium compound, and crystal particles of a garnet-type ion-conducting oxide represented by a general formula $(Li_{x-3y-z},E_y,H_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \le x-3y-z \le 7$; $0 \le y \le 0.25$; $0 < z \le 2.8$; $2.5 \le \alpha \le 3.5$; $1.5 \le \beta \le 2.5$; and $11 \le \gamma \le 13$).

8 Claims, 4 Drawing Sheets

(56) References Cited

U.S. PATENT DOCUMENTS

| | | |
|---|---|---|
| 2019/0207249 A1 | 7/2019 | Nakanishi et al. |
| 2019/0207250 A1 | 7/2019 | Nakanishi et al. |

FOREIGN PATENT DOCUMENTS

| | | |
|---|---|---|
| JP | 2001-210360 A | 8/2001 |
| JP | 2007-5279 A | 1/2007 |
| JP | 2012-96940 A | 5/2012 |
| JP | 2012-174659 A | 9/2012 |
| JP | 2013-37992 A | 2/2013 |
| JP | 2013-532361 A | 8/2013 |
| JP | 2013-219017 A | 10/2013 |
| JP | 2013-232284 A | 11/2013 |
| JP | 2013-256435 A | 12/2013 |
| JP | 2014-241288 A | 12/2014 |
| JP | 2015-038030 A | 2/2015 |
| JP | 2015-041573 A | 3/2015 |
| JP | 2015-60737 A | 3/2015 |
| JP | 2016-171068 A | 9/2016 |
| JP | 2017-216222 A | 12/2017 |
| KR | 10-2017-0134231 A | 12/2017 |
| WO | 2012/114193 A1 | 8/2012 |
| WO | 2016/210371 A1 | 12/2016 |
| WO | 2017/015511 A1 | 1/2017 |
| WO | 2017/018217 A1 | 2/2017 |
| WO | 2017/130622 A1 | 8/2017 |

OTHER PUBLICATIONS

Zhen Feng Yow et al., "Effect of $Li^+/H^+$ exchange in water treated Ta-doped $Li^7La_3Zr_2O_{12}$," Solid State Ionics, vol. 292, 2016, pp. 122-129.
Office Action dated Oct. 18, 2019 issued in U.S. Appl. No. 16/126,137.
Notice of Allowance dated Aug. 26, 2019, issued by the United States Patent and Trademark Office in U.S. Appl. No. 15/605,006.
Notice of Allowance dated Nov. 18, 2019, issued by the United States Patent and Trademark Office in U.S. Appl. No. 15/605,006.
Office Action dated Apr. 25, 2019, issued by the United States Patent and Trademark Office in U.S. Appl. No. 15/605,006.
Office Action dated Oct. 18, 2019, issued by the United States Patent and Trademark Office in U.S. Appl. No. 16/232,635.
Notice of Allowance dated Mar. 20, 2020, issued by the United States Patent and Trademark Office in U.S. Appl. No. 15/605,006.
Office Action dated Apr. 17, 2020, issued by the United States Patent and Trademark Office in U.S. Appl. No. 16/232,635.
Office Action dated Apr. 24, 2020, issued by the United States Patent and Trademark Office in U.S. Appl. No. 16/126,137.
Notice of Allowance dated Aug. 25, 2020, issued by the United States Patent and Trademark Office in U.S. Appl. No. 15/605,006.

* cited by examiner

SLURRY, METHOD FOR PRODUCING SOLID ELECTROLYTE LAYER, AND METHOD FOR PRODUCING ALL-SOLID-STATE BATTERY

TECHNICAL FIELD

The disclosure relates to a slurry, a method for producing a solid electrolyte layer, and a method for producing an all-solid-state battery.

BACKGROUND

For higher battery safety, the development of all-solid-state batteries is promoted, in which a solid electrolyte is used in place of a liquid electrolyte, and other battery components are all solid components.

For example, Patent Literature 1 discloses a process of manufacturing an all-solid-state battery, which includes producing a slurry and forming the slurry into a green sheet, the slurry containing a resin removing promoter ($Fe_2O_3$ powder), a solid electrolyte material, polyacetal resin and alcohol.

Patent Literature 2 discloses that a solid electrolyte is dispersed in a solvent containing a binder and a plasticizer to form a slurry for forming a solid electrolyte layer, and a green sheet is produced by using the slurry.

Patent Literature 3 discloses a method for producing an all-solid secondary battery, in which a positive electrode material, a solid electrolyte material and a negative electrode material contain a binding material each; a formed material of the positive electrode material, that of the solid electrolyte material and that of negative electrode material are laminated; and the resulting laminate is fired by means of microwave heating.

Patent Literature 1: Japanese Patent Application Laid-Open (JP-A) No. 2015-060737
Patent Literature 2: JP-A No. 2007-005279
Patent Literature 3: JP-A No. 2001-210360

Most of inorganic material products (e.g., ceramics) are produced through the steps of resin molding by a green sheet method, for example, and degreasing by heating.

In general, the synthesis temperature of inorganic material products is about 1000° C. Meanwhile, the temperature at which general resin products are absolutely fired and decomposed, is about 600° C. Therefore, the production of inorganic material products does not cause such a problem that a polymer binder (e.g., resin) cannot be thermally decomposed.

In the production of an all-solid-state battery, to integrally sinter a solid electrolyte layer and a cathode or anode, inhibiting a cathode or anode active material from reacting at an interface, is needed. Therefore, there is a demand for lowering the sintering temperature of a solid electrolyte (to about 400° C.)

To produce the solid electrolyte layer by using and applying a slurry, a coating slurry generally needs a polymer binder such as resin. However, the use of the polymer binder has the following problem: as the sintering temperature decreases, the polymer binder becomes more resistant to thermal decomposition. This problem interferes with achieving a lower sintering temperature.

For example, even in the case of using the resin removing promoter described in Patent Literature 1, a decrease in resin decomposition temperature is at an insufficient level (about 500° C.). In addition, there is a possibility that a side reaction occurs between the solid electrolyte material and the resin removing promoter.

In addition, since the removal of the polymer binder is not sufficient, carbon or carbide, which is a residue of the polymer binder, remains inside the solid electrolyte layer and is problematic in that the charge-discharge properties of an all-solid-state battery is deteriorated by the residue of the polymer binder. Accordingly, there is a demand for reducing the usage of the polymer binder.

SUMMARY

In light of the above circumstance, an object of the disclosed embodiments is to provide a slurry for a solid electrolyte, which can reduce the usage of the polymer binder, a method for producing a solid electrolyte layer, and a method for producing an all-solid-state battery.

In a first embodiment, there is provided a slurry comprising a solvent, a lithium compound, and crystal particles of a garnet-type ion-conducting oxide represented by a general formula $(Li_{x-3y-z},E_y,H_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$).

The solvent may contain at least one selected from the group consisting of water and alcohols having 1 to 8 carbon atoms.

The element L may be La, and the element M may be at least one kind of element selected from the group consisting of Zr, Nb and Ta.

The lithium compound may be at least one kind of compound selected from the group consisting of $LiNO_3$ and LiOH.

The solvent may be supersaturated with the lithium compound.

In another embodiment, there is provided a method for producing a solid electrolyte layer, the method comprising steps of: preparing a slurry comprising a solvent, a lithium compound, and crystal particles of a garnet-type ion-conducting oxide represented by a general formula $(Li_{x-3y-z},E_y,H_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$), producing a green sheet for the solid electrolyte layer by using the slurry, and sintering the green sheet for the solid electrolyte layer.

In another embodiment, there is provided a method for producing an all-solid-state battery comprising a cathode active material layer, an anode active material layer, and a solid electrolyte layer disposed between the cathode active material layer and the anode active material layer, the method comprising steps of: preparing a slurry comprising a solvent, a lithium compound, and crystal particles of a garnet-type ion-conducting oxide represented by a general formula $(Li_{x-3y-z},E_y,H_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$), producing a green sheet for the solid electrolyte layer by using the slurry, and sintering the green sheet for the solid electrolyte layer after the step of producing the green sheet for the solid electrolyte layer.

The method for producing the all-solid-state battery may further comprise, after the step of producing the green sheet for the solid electrolyte layer, a step of forming a laminate in which the green sheet for the solid electrolyte layer is disposed between a green sheet for the cathode active material layer and a green sheet for the anode active material layer, wherein the sintering step is a step of sintering the laminate.

According to the disclosed embodiments, the slurry for the solid electrolyte, which can reduce the usage of the polymer binder, the method for producing the solid electrolyte layer, and the method for producing the all-solid-state battery, can be provided.

BRIEF DESCRIPTION OF THE DRAWINGS

In the accompanying drawings.

DETAILED DESCRIPTION

1. The Slurry

The slurry of the disclosed embodiments comprises a solvent, a lithium compound, and crystal particles of a garnet-type ion-conducting oxide represented by a general formula $(Li_{x-3y-z}E_yH_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$).

As a material for a solid electrolyte, attention is paid to a garnet-type ion-conducting oxide comprising at least Li, La, Zr and O (hereinafter, the oxide may be referred to as LLZ).

As a result of diligent research, it was found that by using the LLZ, a green sheet can be produced without a polymer binder.

Figure 1:
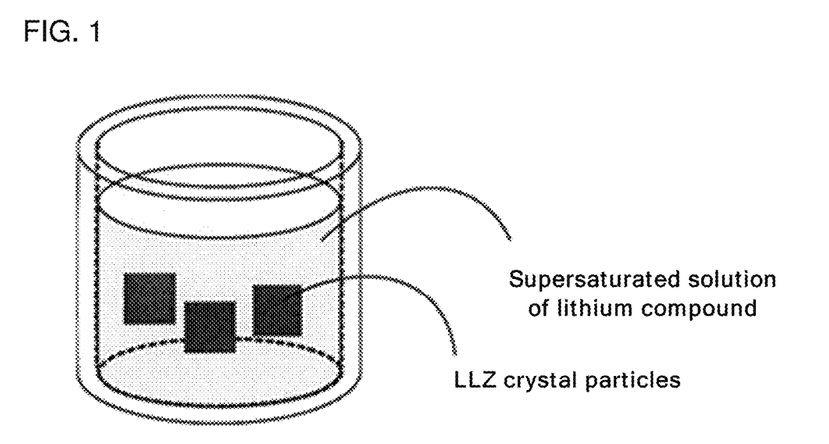
FIG. 1 is an image of a slurry obtained by immersing crystal particles of a garnet-type ion-conducting oxide in a supersaturated solution of a lithium compound.

FIG. 1 is an image of a slurry obtained by immersing crystal particles of a garnet-type ion-conducting oxide (referred to as LLZ in FIG. 1) in a supersaturated solution of a lithium compound.

Figure 2:
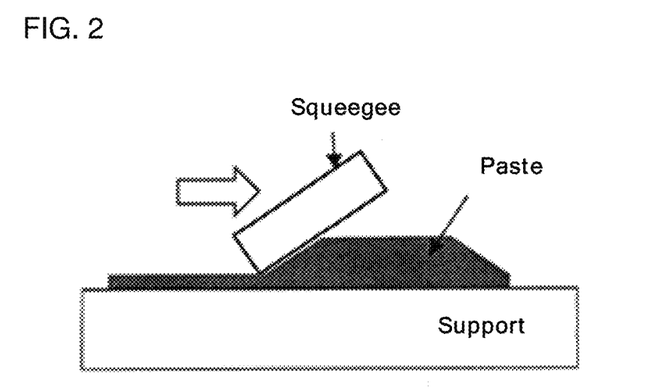
FIG. 2 is an image of applying the slurry onto a support.

FIG. 2 is an image of applying the slurry onto a support.

Figure 3:
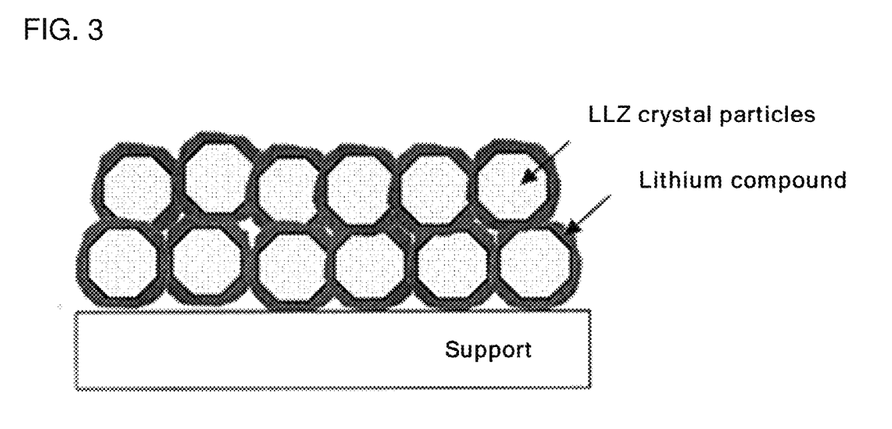
FIG. 3 is an image of a green sheet obtained by drying the applied slurry to evaporate a solvent.

FIG. 3 is an image of a green sheet obtained by drying the applied slurry to evaporate a solvent.

The slurry as shown in FIG. 1, which contains a solvent, a lithium compound and LLZ crystal particles subjected to substitution of part of lithium ions with protons (hydrogen ions), is applied to a desired support as shown in FIG. 2, and the solvent is evaporated.

As a result, as shown in FIG. 3, the lithium compound (flux) is solidified by desolventization, thereby allowing a coating film (green sheet) to retain its shape.

Figure 4:
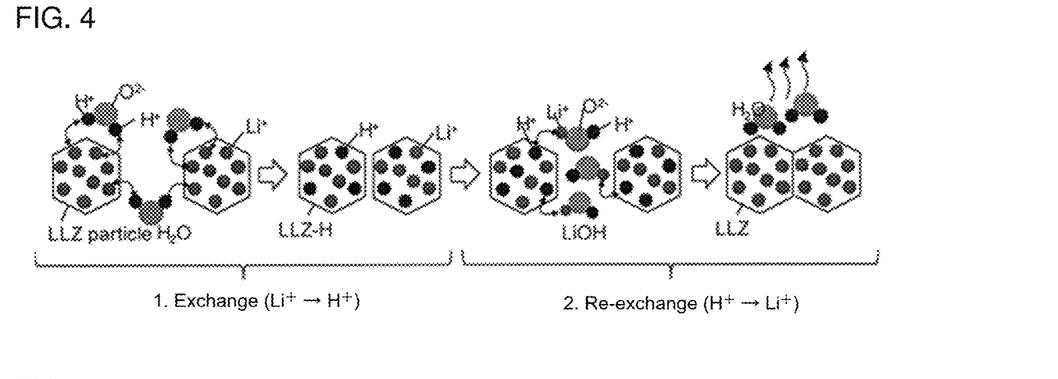
FIG. 4 is an image of the flow of a chemical reaction between a lithium compound and crystal particles of a garnet-type ion-conducting oxide.

FIG. 4 is an image of the flow of a chemical reaction between lithium compound and the crystal particles of the garnet-type ion-conducting oxide.

The left part ("1. Exchange ($Li^+ \rightarrow H^+$)") of FIG. 4 shows the state of the crystal particles of the garnet-type ion-conducting oxide (referred to as LLZ in FIG. 4) before and after part of the lithium ions ($Li^+$) of the crystal particles are substituted with hydrogen ions ($H^+$).

The right part ("2. Re-exchange ($H^+ \rightarrow Li^+$)") of FIG. 4 shows the state of the crystal particles of the garnet-type ion-conducting oxide before and after the hydrogen ions ($H^+$) in the crystal particles of the garnet-type ion-conducting oxide are substituted with the lithium ions ($Li^+$) of the lithium compound.

As shown by the right part ("2. Re-exchange ($H^+ \rightarrow Li^+$)") of FIG. 4, the lithium ions ($Li^+$) of the lithium compound are incorporated into the crystal of the LLZ crystal particles. The hydrogen ions ($H^+$) released from the inside of the crystal of the LLZ crystal particles, bind to the anions ($X^-$) of the lithium compound, form a reaction product and move outside the system; therefore, they do not remain between the LLZ crystal particles.

Once the coating film as shown in FIG. 3 is heated, as shown in FIG. 4, a chemical reaction occurs between the lithium compound and the LLZ crystal particles subjected to the substitution of part of the lithium ions with protons (hydrogen ions). As a result, the lithium compound is evaporated and, at the same time, the LLZ crystal particles subjected to resubstitution of the protons (hydrogen ions) with lithium ions are attached to each other, thereby obtaining a solid electrolyte layer only.

As described above, according to the disclosed embodiments, the green sheet can be produced without the polymer binder. Therefore, the usage of the polymer binder can be reduced in the battery production.

When the polymer binder is not used, thermal decomposition of the polymer binder is not needed. Therefore, the green sheet can be sintered at low temperature (for example, at a temperature equal to or lower than the thermal decomposition temperature of the polymer binder).

In addition, by lowering the sintering temperature of the green sheet, battery production costs can be reduced.

In the disclosed embodiments, the green sheet means an unsintered molded product (unsintered product) obtained by applying the slurry to the support or the like and drying the applied slurry.

The slurry of the disclosed embodiments may contain the polymer binder. From the viewpoint of low-temperature sintering of the green sheet, for example, with respect to 100 parts by mass of the slurry, the content of the polymer binder may be 33 part by mass or less, or the polymer binder may not be contained.

In the disclosed embodiments, the polymer binder is a conventionally known polymer binder. As the polymer binder, examples include, but are not limited to, fluorine resins having a sulfonic acid group, such as Nafion (product name, manufactured by DuPont), Flemion (product name, manufactured by Asahi Glass Co., Ltd.) and Aciplex (product name, manufactured by Asahi Kasei Corporation), polytetrafluoroethylene (PTFE), tetrafluoroethylene-hexafluoropropylene copolymer resin (FEP), tetrafluoroethyleneperfluoroalkyl vinyl ether copolymer resin (PFA), starch, polyvinyl alcohol, silicon-modified polyvinyl alcohol, polyacrylamide, cluster dextrin, chitosan, alginate, carboxymethyl cellulose, hydroxyethyl cellulose, acrylic resin, styrene-acrylic copolymer, styrene-butadiene copolymer, ethylene-vinyl acetate copolymer, and polypropylene.

1-(1) The Crystal Particles of the Garnet-Type Ion-Conducting Oxide

In the disclosed embodiments, the crystal particles of the garnet-type ion-conducting oxide are not particularly limited, as long as they are represented by the above-mentioned general formula; they are particles subjected to the substitution of part of the lithium ions with protons; and they can receive lithium ions from the lithium compound described below.

When the composition of the Li in the general formula is x−3y−z>7, it is supposed that the crystal structure of the LLZ is changed from a cubic crystal structure to a tetragonal crystal structure, thereby impairing crystal symmetry and decreasing lithium ion conductivity.

Meanwhile, when the composition of the Li in the general formula is x−3y−z<3, it is supposed that the potential of the 96 h site (a specific site in which the Li in the crystal structure of the LLZ will be incorporated) increases and makes it difficult for the Li to be incorporated in the crystal, thereby decreasing Li occupancy and decreasing lithium ion conductivity.

The element E is an element that is four-coordinated as with Li and has an ionic radius close to Li (Li: 0.59 Å).

In the disclosed embodiments, the LLZ may comprise, as the element E, at least one kind of element selected from the group consisting of Al, Ga, Fe and Si, at least one kind of element selected from the group consisting of Al and Ga, or an Al element.

The elements Al, Ga, Fe and Si as the element E, are major elements that are contained in garnet-type oxides that are well-known as gems.

Since Al, Ga, Fe and Si are elements that are contained in gems such as garnet, they can be substituted with the Li in the Li site.

The substitution of the Li site with the elements Al, Ga, Fe, Si, etc., has a crystal structure stabilizing effect.

On the other hand, it is supposed that the substitution with the elements Al, Ga, Fe, Si, etc., makes the property of the crystal closer to gem garnet (the Mohs hardness of gem garnet is 7.5).

As a result, it is supposed that once large amounts of Al, Ga, Fe, Si, etc., are incorporated, instead of plastic deformation, the particles cause cracking.

Therefore, it is supposed that although the addition of small amounts of Al, Ga, Fe, Si, etc., is allowed for the purpose of stabilizing the crystal structure, there is an upper limit to cause plastic deformation.

In the disclosed embodiments, since the element E in the general formula is contained in a range of $0 \leq y \leq 0.25$, the stability of the crystal structure of the LLZ can be increased, and the synthesis of the LLZ can be easy.

From the viewpoint of increasing the lithium ion conductivity, the element E in the general formula may be contained in a range of $0 \leq y < 0.12$ or in a range of $0 \leq y < 0.04$.

In the disclosed embodiments, the element L contained in the LLZ is not particularly limited, as long as it is at least one kind of element selected from the group consisting of an alkaline-earth metal and a lanthanoid element. This is because a small change in the crystal structure and high ion conductivity can be obtained. As used herein, the alkaline-earth metal is a concept that encompasses Ca, Sr, Ba and Ra. The element L may be La, since the ion conductivity of the garnet-type ion-conducting oxide can be further increased.

In the disclosed embodiments, as long as the element L of the general formula is contained in a range of $2.5 \leq \alpha \leq 3.5$, a change in the crystal structure of the LLZ is small, and the lithium ion conductivity of the LLZ can be increased.

In the disclosed embodiments, the element M contained in the LLZ is not particularly limited, as long as it is at least one kind of element selected from the group consisting of a transition element that can be six-coordinated with oxygen and typical elements in groups 12 to 15 of the periodic table. This is because a change in the crystal structure of the LLZ is small, and the ion conductivity of the LLZ is high.

In the disclosed embodiments, as long as the element M of the general formula is contained in a range of $1.5 \leq \beta \leq 2.5$, a change in the crystal structure of the LLZ is small, and the lithium ion conductivity of the LLZ can be increased.

As the element M, examples include, but are not limited to, Sc, Y, Ti, Zr, Hf, V, Nb, Ta, Cr, Mo, W, Mn, Fe, Co, Ni, Cu, Zn, Cd, Al, Ga, Ge, Sn, Sb and Bi.

Of these elements, the element M may be at least one kind of element selected from the group consisting of Zr, Nb and Ta, from the viewpoint of obtaining a relatively large ionic radius, inhibiting a shrinkage in crystal lattice constant, and inhibiting a decrease in the lithium ion conductivity of the LLZ. Also, the element M may be at least one kind of element selected from the group consisting of Zr and Nb, from the point of view that similar effects can be obtained since the elements have similar physical and/or chemical properties.

The ratio of the Zr and Nb in the composition of the LLZ has an influence on the physical value of the lithium ion conductivity and the crystal structure. As the ratio of the Zr increases, the amount of the Li increases.

In general, when the total amount of the Li and H in the composition of the LLZ is more than 6.75, the crystal structure changes from a cubic crystal structure to a tetragonal crystal structure. In general, the LLZ is said to have higher ion conductivity when the crystal structure is a cubic crystal structure.

Therefore, when the amount of the Zr in the composition is smaller, the total amount of the Li and H in the composition of the LLZ is small and makes it easy for the LLZ to have a cubic crystal structure.

However, when the amount of the Zr in the composition is decreased, a shrinkage in lattice volume occurs. As a result, the ion conducting path for the lithium ions that can move in the crystal, is decreased in size and, therefore, in lithium ion conductivity of the LLZ.

Due to the above reason, the amount of the Zr in the composition may be in a range of from 1.4 to 1.75. When the composition of the Zr contained in the general formula is less than 1.5, elements other than the Zr are contained as the element M so that the composition of the element M contained in the general formula is 1.5 or more and 2.5 or less.

In the disclosed embodiments, as long as the oxygen O contained in the LLZ composition is in a range of $11 \leq \gamma \leq 13$, a change in the crystal structure of the LLZ can be small.

As the garnet-type ion-conducting oxide before part of the lithium ions are substituted with hydrogen ions (hereinafter it may be referred to as the garnet-type ion-conducting oxide before the hydrogen ion partial substitution), examples include, but are not limited to, $Li_7La_3Zr_2O_{12}$, $Li_{6.4}La_3Zr_{1.4}Nb_{0.6}O_{12}$, $Li_{6.5}La_3Zr_{1.7}Nb_{0.3}O_{12}$, $Li_{6.8}La_3Zr_{1.7}Nb_{0.3}O_{12}$, $(li_{6.2}Al_{0.2})La_3Zr_{1.7}Nb_{0.3}O_{12}$, $(Li_{5.8}Al_{0.2})La_3(Zr_{1.4}Nb_{0.6})O_{12}$, $(Li_{6.1}Al_{0.13})La_3(Zr_{1.4}Nb_{0.6})O_{12}$, $(Li_{6.3}Al_{0.02})La_3(Zr_{1.4}Nb_{0.6})O_{12}$, and $(Li_{6.2}Ga_{0.2})La_3Zr_{1.7}Nb_{0.3}O_{12}$.

In the LLZ of the disclosed embodiments, the amount of hydrogen ions (protons) incorporated by the substitution, is not particularly limited, as long as the z in the general formula $(Li_{x-3y-z}E_yH_z)L_\alpha M_\beta O_\gamma$ is in a range of $0 < z \leq 2.8$. This is because a change in the crystal structure is small.

The method for substituting part of the lithium ions in the LLZ of the disclosed embodiments with hydrogen ions is not particularly limited. As the method, examples include, but are not limited to, using a powder of the LLZ as a raw material and stirring the powder in pure water for about 5 days at room temperature.

The amount of hydrogen ions incorporated by the substitution can be estimated by inductively-coupled plasma (ICP) analysis of the powder of the LLZ before and after the substitution.

That is, the hydrogen ion amount in the LLZ cannot be quantitated by the inductively-coupled plasma (ICP) analysis; however, the lithium ion amounts in the LLZ before and after the hydrogen ion substitution can be quantitated.

Therefore, the amount of lithium ion change before and after the substitution can be calculated from the lithium ion amounts in the LLZ before and after the substitution. From the amount of the lithium ion change, it is possible to estimate how much lithium ions were substituted with hydrogen ions.

The average particle diameter of the crystal particles of the garnet-type ion-conducting oxide is not particularly limited. It may be in a range of from 0.1 μm to 100 μm.

In the disclosed embodiments, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

1-(2) The Lithium Compound (Flux)

The lithium compound is not particularly limited, as long as the lithium compound can supply lithium ions to the garnet-type ion-conducting oxide; the lithium compound can be dissolved in the below-described solvent; and an anion residue which is left after supplying the lithium ions to the oxide, can be evaporated.

The lithium compound may be a compound that has a melting point at around a temperature at which the hydrogen ions are desorbed from the crystal particles of the garnet-type ion-conducting oxide subjected to the hydrogen ion partial substitution (hereinafter it may be referred to as the garnet-type ion-conducting oxide after the hydrogen ion partial substitution). As the lithium compound, examples include, but are not limited to, LiOH (melting point: 462° C.), $LiNO_3$ (melting point: 260° C.) and $Li_2SO_4$ (melting point: 859° C.). From the viewpoint of lowering the sintering temperature, the lithium compound may be LiOH or $LiNO_3$.

From the viewpoint of inhibiting the elution of lithium from the garnet-type ion-conducting oxide into the below-described solvent, the solvent may be supersaturated with the lithium compound.

In the slurry, the contents of the garnet-type ion-conducting oxide and the lithium compound are not particularly limited. The garnet-type ion-conducting oxide and the lithium compound may be at a ratio (the garnet-type ion-conducting oxide:the lithium compound) of from 50:50 (vol %) to 95:5 (vol %). The molar amount of the lithium in the composition of the lithium compound, may be equal to the molar amount of the hydrogen in the composition of the garnet-type ion-conducting oxide.

1-(3) The Solvent

The solvent is not particularly limited, as long as the solvent does not decompose the garnet-type ion-conducting oxide; the solvent can dissolve the lithium compound; and the solvent can be evaporated at a temperature lower than a desired sintering temperature. As the solvent, examples include, but are not limited to, water and alcohols having 1 to 8 carbon atoms.

From the viewpoint of ease of handling, the alcohols may be those having a boiling point of from 60° C. to 90° C. As the alcohols, examples include, but are not limited to, methanol, ethanol and 2-propanol. To control the boiling point, two or more kinds of alcohols may be mixed, or methanol may be mixed with a different alcohol.

From the viewpoint of increasing the solubility of the lithium compound in the solvent, a small amount of water may be added to the alcohol to control the solubility of the lithium compound in the solvent.

The slurry of the disclosed embodiments is a slurry for the solid electrolyte, and it can be used as a material for the solid electrolyte contained in the cathode active material layer, the anode active material layer and the solid electrolyte layer.

2. The Method for Producing the Solid Electrolyte Layer

The method for producing the solid electrolyte layer according to the disclosed embodiments, comprises steps of: preparing a slurry comprising a solvent, a lithium compound, and crystal particles of a garnet-type ion-conducting oxide represented by a general formula $(Li_{x-3y-z}E_yH_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$), producing a green sheet for the solid electrolyte layer by using the slurry, and sintering the green sheet for the solid electrolyte layer.

The outline of the method for producing the solid electrolyte layer of the disclosed embodiments, is as described below.

The LLZ is preliminarily synthesized at high temperature (e.g., 1000° C. or more).

Then, part of the lithium ions in the thus-obtained LLZ crystal particles, are substituted with protons, thereby obtaining the LLZ crystal particles after the hydrogen ion partial substitution.

Then, the slurry containing the solvent, the lithium compound and the LLZ crystal particles after the hydrogen ion partial substitution, is prepared.

The slurry is applied to the support (e.g., electrode or current collector), thereby forming the coating film (green sheet).

Then, by sintering the coating film, the protons in the LLZ crystal particles after the hydrogen ion partial substitution, are resubstituted with the lithium ions in the lithium compound. By using a chemical reaction caused in this resubstitution, the usage of the polymer binder can be reduced; the LLZ crystal particles can be attached to each other at lower temperature than ever before (from 350° C. to 550° C.); and the solid electrolyte layer can be produced.

The method for producing the solid electrolyte layer of the disclosed embodiments comprises at least the following "2-(1) The preparation step", "2-(2) The step of producing the green sheet for the solid electrolyte layer" and "2-(3) The sintering step".

2-(1) The Preparation Step

The preparation step is a step of preparing the slurry comprising the solvent, the lithium compound, and the crystal particles of the garnet-type ion-conducting oxide.

The components contained in the slurry, that is, the solvent, the lithium compound and the crystal particles of the garnet-type ion-conducting oxide will not be described here since they are the same as those described above under "1. The slurry".

In the production of the slurry, generally, lithium is eluted from the LLZ when a polar solvent is used as the solvent. Accordingly, to inhibit the elution of lithium from the LLZ, first, a desired lithium compound may be dissolved in the solvent, and then the LLZ may be added to the solvent.

Also in the production of the slurry, the solvent may be supersaturated with the lithium compound, from the viewpoint of inhibiting the elution of lithium from the LLZ.

Also in the production of the slurry, a supersaturated solution may be produced by dissolving the lithium compound in the solvent so that the molar amount of the lithium in the composition of the lithium compound is equal to the molar amount of the hydrogen in the composition of the LLZ.

Examples of the degree of lithium compound supersaturation of the solvent (the lithium compound/the solvent) are shown below.

Degree of LiOH supersaturation: 12.5 mg/100 mL ($H_2O$)

Degree of $LiNO_3$ supersaturation: 19.1 mg/100 mL (EtOH)

2-(2) The Step of Producing the Green Sheet for the Solid Electrolyte Layer

The step of producing the green sheet is a step of producing the green sheet by using the slurry.

As the method for producing the green sheet, examples include, but are not limited to, forming the coating film (green sheet) by applying the slurry to the support (e.g., electrode or current collector).

The method for applying the slurry is not limited. As the method, examples include, but are not limited to, a doctor blade method, a die coater, and a comma coater.

2-(3) The Sintering Step

The sintering step is a step of sintering the green sheet. For the sintering temperature, the lower limit may be 350° C. or more, or it may be 400° C. or more from the viewpoint of increasing reactivity. The upper limit may be 1000° C. or less; it may be 850° C. or less from the viewpoint of the crystal stability of the LLZ; it may be 650° C. or less from the viewpoint of ensuring reactivity when the LLZ contains Si; or it may be 550° C. or less when the LLZ does not contain Si.

When the lower limit is less than 350° C., the resubstitution of the protons in the LLZ crystal particles after the hydrogen ion partial substitution with the lithium ions in the lithium compound, is less likely to occur. When the upper limit is more than 1000° C., the lithium in the LLZ disappears, and the LLZ is decomposed.

According to the disclosed embodiments, even in the case of low-temperature sintering at 350° C. to 550° C., by resubstituting the protons in the LLZ crystal particles after the hydrogen ion partial substitution with the lithium ions in the lithium compound, the LLZ crystal particles can be attached to each other without the polymer binder, and the solid electrolyte layer can be produced.

Pressure is applied at the time of sintering. The pressure is not particularly limited, and it may be equal to or more than the atmospheric pressure and equal to or less than 6 ton/$cm^2$ ($\approx$588 MPa).

In the sintering step, the sintering atmosphere is not particularly limited.

The sintering time is not particularly limited. It may be in a range of from 1 minute to 6000 minutes.

3. The Method for Producing the all-Solid-State Battery

The method for producing the all-solid-state battery according to the disclosed embodiments, is a method for producing an all-solid-state battery comprising a cathode active material layer, an anode active material layer, and a solid electrolyte layer disposed between the cathode active material layer and the anode active material layer, the method comprising steps of: preparing a slurry comprising a solvent, a lithium compound, and crystal particles of a garnet-type ion-conducting oxide represented by a general formula ($Li_{x-3y-z}$,$E_y$,$H_z$)$L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and typical elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$), producing a green sheet for the solid electrolyte layer by using the slurry, and sintering the green sheet for the solid electrolyte layer after the step of producing the green sheet for the solid electrolyte layer.

The method for producing the all-solid-state battery according to the disclosed embodiments, comprises at least "3-(1) The preparation step", "3-(2) The step of producing the green sheet for the solid electrolyte layer" and "3-(3) The sintering step". As needed, the method comprises "3-(4) The step of forming the laminate" before "3-(3) The sintering step". Of the steps, "3-(1) The preparation step" and "3-(2) The step of producing the green sheet for the solid electrolyte layer" will not be described here, since they are the same as the above-described "2-(1) The preparation step" and "2-(2) The step of producing the green sheet for the solid electrolyte layer".

3-(3) The Sintering Step

The sintering step is a step of sintering the green sheet for the solid electrolyte layer after the step of producing the green sheet for the solid electrolyte layer.

The sintering temperature, sintering time, sintering pressure, sintering atmosphere, etc., of "3-(3) The sintering step"

will not be described here, since they are the same as those of the above-described "2-(3) The sintering step".

3-(4) The Step of Forming the Laminate

The step of forming the laminate is a step of forming, after the step of producing the green sheet for the solid electrolyte layer, the laminate in which the green sheet for the solid electrolyte layer is disposed between the green sheet for the cathode active material layer and the green sheet for the anode active material layer.

When the method for producing the all-solid-state battery comprises "3-(4) The step of forming the laminate", "3-(3) The sintering step" may be "a step of sintering the laminate after the step of forming the laminate".

When the method for producing the all-solid-state battery does not comprise "3-(4) The step of forming the laminate", the cathode active material layer and the anode active material layer may be prepared by sintering the green sheet for the cathode active material layer and the green sheet for the anode active material layer, respectively, and then the green sheet for the solid electrolyte layer may be disposed between the cathode active material layer and the anode active material layer.

From the viewpoint of increasing the production efficiency of the all-solid-state battery, the laminate of the green sheet for the cathode active material layer, the green sheet for the solid electrolyte layer and the green sheet for the anode active material layer, may be integrally sintered.

In the step of forming the laminate, an unsintered product of the cathode active material layer (the green sheet for the cathode active material layer), an unsintered product of the anode active material layer (the green sheet for the anode active material layer) and the green sheet for the solid electrolyte layer, which will be disposed between the unsintered product of the cathode active material layer and the unsintered product of the anode active material layer, may be stacked to form a laminate having a single cell structure.

Also in the step of forming the laminate, a laminate may be formed by stacking a plurality of the laminates having the single cell structure and disposing the below-described current collector therebetween. In this case, the laminates having the single cell structure may be electrically stacked in series and/or in parallel.

Figure 10:
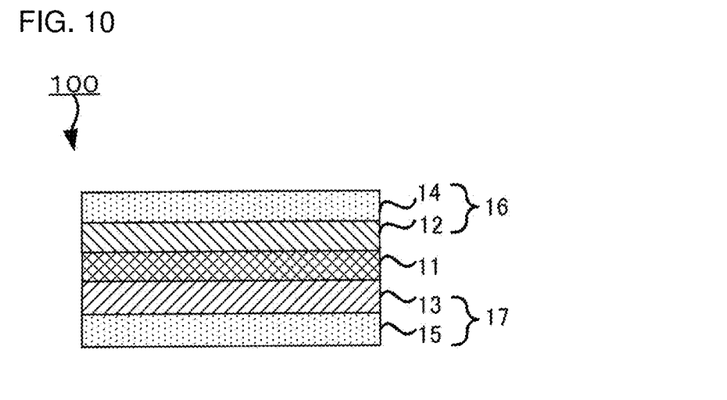
FIG. 10 is a schematic sectional view of an example of an all-solid-state battery.

FIG. 10 is a schematic sectional view of an example of the all-solid-state battery of the disclosed embodiments.

An all-solid-state battery 100 comprises a cathode 16, an anode 17 and a solid electrolyte layer 11. The cathode 16 comprises a cathode active material layer 12 and a cathode current collector 14. The anode 17 comprises an anode active material layer 13 and an anode current collector 15. The solid electrolyte layer 11 is disposed between the cathode 16 and the anode 17.

The cathode comprises at least the cathode active material layer. As needed, it further includes the cathode current collector.

The cathode active material layer contains at least the cathode active material. As needed, it contains an electroconductive material and a solid electrolyte.

As the cathode active material, conventionally know materials may be used. When the all-solid-state battery is a lithium battery, for example, lithium cobaltate ($LiCoO_2$), lithium nickelate ($LiNiO_2$), $Li_{1+x}Ni_{1/3}Mn_{1/3}Co_{1/3}O_2$ ($0 \leq x < 0.3$), lithium manganate ($LiMn_2O_4$), different element-substituted Li—Mn spinels represented by the composition formula $Li_{1+x}Mn_{2-x-y}M_yO_4$ (where M is at least one kind of element selected from the group consisting of Al, Mg, Co, Fe, Ni and Zn; $0 \leq x < 0.5$; $0 \leq y < 2$), lithium titanate, and lithium metal phosphate ($LiMPO_4$, M=Fe, Mn, Co, Ni) may be used.

The form of the cathode active material is not particularly limited. As the form, examples include, but are not limited to, a particulate form and a plate form.

The solid electrolyte may be a substance that has lithium ion conductivity and that is not fluidized even when it is brought into contact with an active material. As the solid electrolyte, examples include, but are not limited to, $Li_3PO_4$, $LiNbO_3$, $Li_4Ti_5O_{12}$, and the garnet-type ion-conducting oxide represented by the general formula.

The electroconductive material is not particularly limited. As the electroconductive material, examples include, but are not limited to, acetylene black, Ketjen Black and carbon fiber.

The thickness of the cathode active material layer is not particularly limited. For example, it may be from 10 μm to 250 μm, or it may be from 20 μm to 200 μm.

The cathode current collector functions to collect current from the cathode active material layer. As the material for the cathode current collector, examples include, but are not limited to, metal materials such as SUS, Ni, Cr, Au, Pt, Al, Fe, Ti and Zn. As the form of the cathode current collector, examples include, but are not limited to, a foil form, a plate form and a mesh form.

The cathode may further include a cathode lead that is connected to the cathode current collector.

The method for forming the cathode is not particularly limited. For example, the slurry for the solid electrolyte and the cathode active material are mixed to produce a paste. The paste is applied onto a support (e.g., the solid electrolyte layer or current collector) and dried to form the green sheet for the cathode active material layer. Then, the green sheet for the cathode active material layer is sintered, thereby obtaining the cathode.

The anode comprises at least the anode active material layer. As needed, it includes an anode current collector for collecting current from the anode active material layer.

The anode active material layer contains at least the anode active material. As needed, it contains an electroconductive material and a solid electrolyte.

As the anode active material, examples include, but are not limited to, carbonaceous materials (such as graphite and hard carbon), Si, Si alloys and $Li_4Ti_5O_{12}$.

As the electroconductive material and solid electrolyte used for the anode active material layer, the same materials as those used for the above-described cathode active material layer, may be used.

The thickness of the anode active material layer is not particularly limited. For example, it may be from 10 μm to 100 μm, or it may be from 10 μm to 50 μm.

As the material for the anode current collector, examples include, but are not limited to, metal materials such as SUS, Cu, Ni, Fe, Ti, Co and Zn. As the form of the anode current collector, the same forms as those of the above-described cathode current collector, may be used.

The method for forming the anode is not particularly limited. For example, the slurry for the solid electrolyte and the anode active material are mixed to produce a paste. The paste is applied onto a support (e.g., the green sheet for the solid electrolyte layer or current collector) and dried to form the green sheet for the anode active material layer. Then, the green sheet for the anode active material layer is sintered, thereby obtaining the anode.

The solid electrolyte layer may contain, as the solid electrolyte, at least the garnet-type ion-conducting oxide represented by the general formula. The solid electrolyte layer may also contain a different conventionally-known solid electrolyte material.

The method for forming the solid electrolyte layer is not particularly limited. For example, the slurry for the solid electrolyte is produced, applied onto a support (e.g., the green sheet for the cathode active material layer or the green sheet for the anode active material layer) and dried to form the green sheet for the solid electrolyte layer. Then, the green sheet for the solid electrolyte layer is sintered, thereby obtaining the solid electrolyte layer.

As needed, the all-solid-state battery includes an outer casing for housing the cathode, the anode and the solid electrolyte layer.

The form of the outer casing is not particularly limited. As the form, examples include, but are not limited to, a laminate form.

The material for the outer casing is not particularly limited, as long as it is stable in electrolytes. As the material, examples include, but are not limited to, resins such as polypropylene, polyethylene and acrylic resins.

In the disclosed embodiments, the cathode active material layer, the anode active material layer and the solid electrolyte layer may contain the polymer binder (binding agent). However, by using the slurry of the disclosed embodiments, the cathode active material layer, the anode active material layer and the solid electrolyte layer can be formed without the polymer binder. Therefore, they may not contain the polymer binder. By decreasing the content of the polymer binder or by not containing the polymer binder, even if the cathode active material layer, the anode active material layer and the solid electrolyte layer are formed by low-temperature sintering, lithium ion conductivity of the same level as the case of forming the layers by high-temperature sintering, can be obtained, and the production efficiency of the all-solid-state battery can be increased by low-temperature sintering.

Also, by forming the green sheet for the cathode active material layer, the green sheet for the anode active material layer and the green sheet for the solid electrolyte layer by using the slurry of the disclosed embodiments, the all-solid-state battery can be obtained by integral sintering, and the production efficiency of the all-solid-state battery can be increased.

EXAMPLES

Example 1

[The Production of the Solid Electrolyte Layer]
[The Preparation Step]

Stoichiometric amounts of $LiOH(H_2O)$ (manufactured by Sigma-Aldrich), $La(OH)_3$ (manufactured by Kojundo Chemical Laboratory Co., Ltd.), $ZrO_2$ (manufactured by Kojundo Chemical Laboratory Co., Ltd.) and $Nb_2O_5$ (manufactured by Kojundo Chemical Laboratory Co., Ltd.) were used as starting raw materials. They were mixed to obtain a mixture, and the mixture was heated at 1000° C., thereby obtaining LLZ crystal particles before hydrogen ion partial substitution. The composition of the LLZ thus obtained was $Li_{6.4}La_3Zr_{1.4}Nb_{0.6}O_{12}$.

Then, the thus-obtained LLZ crystal particles before hydrogen ion partial substitution, were stirred in pure water for one hour at room temperature for partial substitution of lithium ions with hydrogen ions, thereby obtaining the LLZ crystal particles after the hydrogen ion partial substitution.

The crystal particles were subjected to ICP analysis before and after the hydrogen ion partial substitution. From the amount of change in the lithium element in the composition of the LLZ crystal particles, the amount of hydrogen ions incorporated by the substitution, was estimated. The composition of the thus-obtained LLZ crystal particles after the hydrogen ion partial substitution, is estimated to be $Li_{5.5}H_{0.9}La_3Zr_{1.4}Nb_{0.6}O_{12}$.

Figure 5:
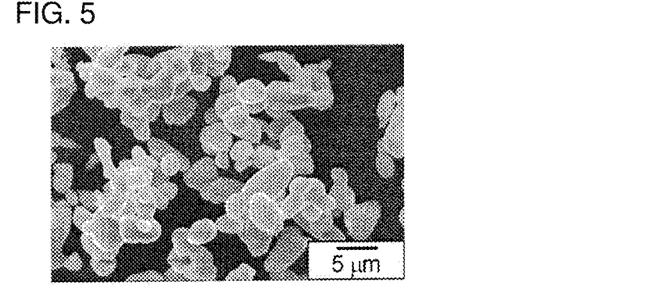
FIG. 5 is a SEM image of crystal particles of a garnet-type ion-conducting oxide of Example 1 before immersion in a solvent.

A SEM image of the thus-obtained crystal particles is shown in FIG. 5.

Ethanol containing a small amount of water, was prepared as a solvent. LiOH and $LiNO_3$ were prepared as a lithium compound. The lithium compound was dissolved in the solvent to produce a supersaturated solution. Then, the above-obtained LLZ crystal particles after the hydrogen ion partial substitution, were added to the supersaturated solution thus prepared, thereby preparing a slurry.

The amounts of the crystal particles and lithium compound contained in the slurry, were controlled so that the molar amount of hydrogen in the composition of the crystal particles was equal to the molar amount of lithium in the composition of the lithium compound.

[The Step of Producing the Green Sheet for the Solid Electrolyte Layer]

The prepared slurry was applied to a support for an electrode and dried to evaporate the solvent, thereby producing a coating film (green sheet) on the support.

Figure 6:
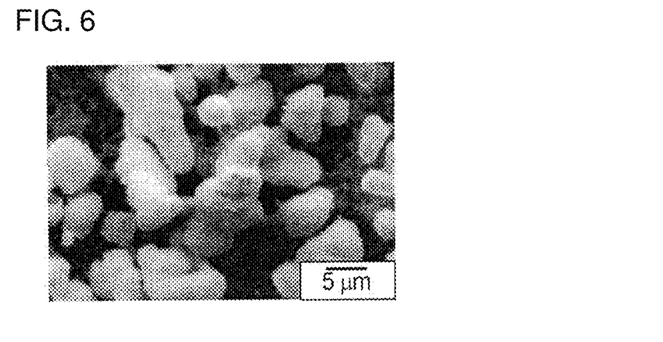
FIG. 6 is a SEM image of the crystal particles of the garnet-type ion-conducting oxide of Example 1 after immersion in a supersaturated solution of a lithium compound and evaporation of the solvent.

A SEM image of the LLZ crystal particles after the evaporation of the solvent, is shown in FIG. 6. As shown in FIG. 6, it is clear that the lithium compound was deposited on the surface of the LLZ crystal particles.

[The Sintering Step]

The thus-obtained green sheet for the solid electrolyte layer was heated in the air atmosphere under the following condition, thereby obtaining a solid electrolyte layer.

Temperature: 400° C.
Time: 4 hours
Pressure: 4 ton/cm$^2$ (≈392 MPa)

Figure 7:
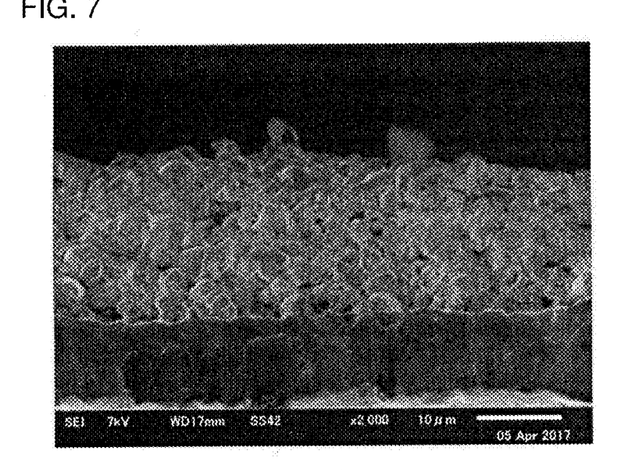
FIG. 7 is a SEM image of a section of the slurry of Example 1 applied onto a support and heated at 400° C.

A SEM image of the solid electrolyte layer obtained by sintering at 400° C., is shown in FIG. 7. As shown in FIG. 7, it is clear that a thin layer having a thickness of 20 µm was formed as the solid electrolyte layer.

Figure 8:
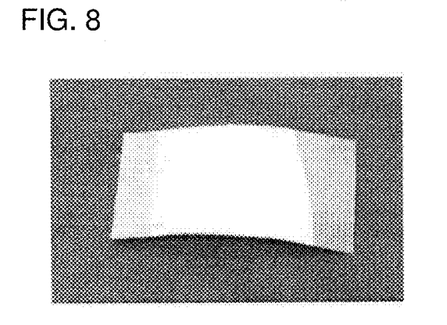
FIG. 8 is a photograph of an appearance of a solid electrolyte layer produced in Example 1.

A photograph of an appearance of the solid electrolyte layer obtained by sintering at 400° C., is shown in FIG. 8. As shown in FIG. 8, it is clear that even when the solid electrolyte layer is formed by using the slurry that does not contain the polymer binder, the solid electrolyte layer can maintain a solid electrolyte layer structure.

Example 2

The preparation step and the step of producing the green sheet for the solid electrolyte layer were carried out in the same manner as Example 1.

[The Step of Forming the Laminate]

A green sheet for a cathode active material layer was prepared, which contained $LiNi_{1/3}Co_{1/3}Mn_{1/3}O_2$ as a cathode active material and the above-obtained LLZ crystal particles after the hydrogen ion partial substitution as a solid electrolyte.

A green sheet for an anode active material layer was prepared, which contained Si as an anode active material and the above-obtained LLZ crystal particles after the hydrogen ion partial substitution as a solid electrolyte.

Then, the green sheet for the solid electrolyte layer was disposed between the green sheet for the cathode active material layer and the green sheet for the anode active material layer.

As a cathode current collector, a SUS foil was disposed on one surface of the green sheet for the cathode active material layer, which is opposite to the other surface that is in contact with the green sheet for the solid electrolyte layer. They were pressed at a pressure of 1 ton/cm$^2$ (≈98 MPa), thereby forming a laminate.

[The Sintering Step]

The thus-obtained laminate was integrally sintered in the air atmosphere under the following condition, thereby obtaining an all-solid-state battery.

Temperature: 400° C.
Time: 4 Hours
Pressure: 4 ton/cm$^2$ (≈392 MPa)

Figure 9:
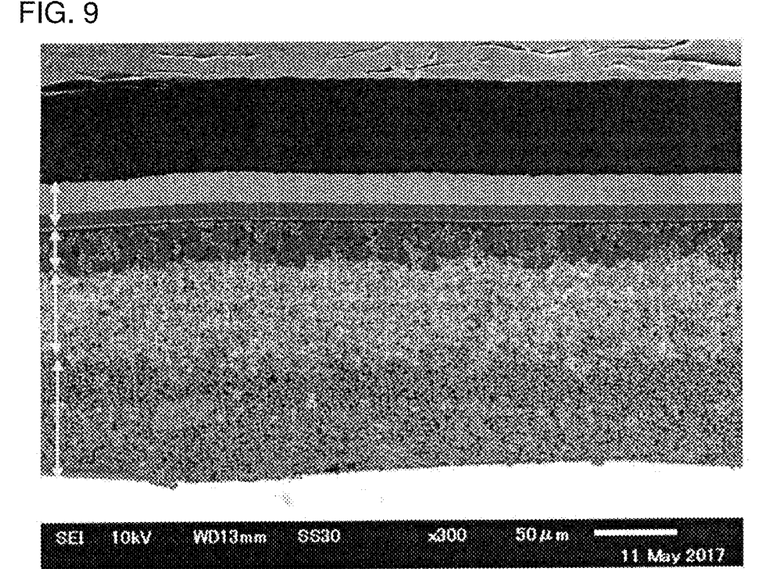
FIG. 9 is a SEM image of a section of an all-solid-state battery produced in Example 2.

A SEM image of a section of the all-solid-state battery obtained by sintering at 400° C., is shown in FIG. 9. As shown in FIG. 9, it is clear that a thin layer having a thickness of 50 μm was formed as the solid electrolyte layer. It is also clear that even when the all-solid-state batter is formed by using the slurry that does not contain the polymer binder, the all-solid-state battery can maintain an all-solid-state battery structure.

REFERENCE SIGNS LIST

11. Solid electrolyte layer
12. Cathode active material layer
13. Anode active material layer
14. Cathode current collector
15. Anode current collector
16. Cathode
17. Anode
100. All-solid-state battery

The invention claimed is:

1. A slurry for a solid electrolyte, the slurry comprising a solvent, a lithium compound, and crystal particles of a garnet-type ion-conducting oxide represented by a general formula $(Li_{x-3y-z},E_y,H_z)L_\alpha M_\beta O_\beta$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$).

2. The slurry according to claim 1, wherein the solvent contains at least one selected from the group consisting of water and alcohols having 1 to 8 carbon atoms.

3. The slurry according to claim 1, wherein the element L is La, and the element M is at least one kind of element selected from the group consisting of Zr, Nb and Ta.

4. The slurry according to claim 1, wherein the lithium compound is at least one kind of compound selected from the group consisting of LiNO$_3$ and LiOH.

5. The slurry according to claim 1, wherein the solvent is supersaturated with the lithium compound.

6. A method for producing a solid electrolyte layer, the method comprising steps of:

preparing a slurry comprising a solvent, a lithium compound, and crystal particles of a garnet-type ion-conducting oxide represented by a general formula $(Li_{x-3y-z},E_y,H_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$), producing a green sheet for the solid electrolyte layer by using the slurry, and sintering the green sheet for the solid electrolyte layer.

7. A method for producing an all-solid-state battery comprising a cathode active material layer, an anode active material layer, and a solid electrolyte layer disposed between the cathode active material layer and the anode active material layer, the method comprising steps of:

preparing a slurry comprising a solvent, a lithium compound, and crystal particles of a garnet-type ion-conducting oxide represented by a general formula $(Li_{x-3y-z},E_y,H_z)L_\alpha M_\beta O_\gamma$ (where E is at least one kind of element selected from the group consisting of Al, Ga, Fe and Si; L is at least one kind of element selected from an alkaline-earth metal and a lanthanoid element; M is at least one kind of element selected from a transition element that can be six-coordinated with oxygen and elements in groups 12 to 15 of the periodic table; $3 \leq x-3y-z \leq 7$; $0 \leq y \leq 0.25$; $0 < z \leq 2.8$; $2.5 \leq \alpha \leq 3.5$; $1.5 \leq \beta \leq 2.5$; and $11 \leq \gamma \leq 13$), producing a green sheet for the solid electrolyte layer by using the slurry, obtaining the solid electrolyte layer by sintering the green sheet for the solid electrolyte layer after the step of producing the green sheet for the solid electrolyte layer, and obtaining the all-solid-state battery by forming a laminate in which the solid electrolyte layer is disposed between the cathode active material layer and the anode active material layer.

8. The method for producing the all-solid-state battery according to claim 7, the method further comprising, after the step of producing the green sheet for the solid electrolyte layer, a step of forming a laminate in which the green sheet for the solid electrolyte layer is disposed between a green sheet for the cathode active material layer and a green sheet for the anode active material layer, wherein the sintering step is a step of obtaining the all solid-state battery by sintering the laminate.

* * * * *